US008750668B2

(12) United States Patent
Chu

(10) Patent No.: US 8,750,668 B2
(45) Date of Patent: Jun. 10, 2014

(54) CABLE MANAGEMENT DEVICE FOR COMMUNICATION PRODUCT

(71) Applicant: Hon Hai Precision Industry Co., Ltd., New Taipei (TW)

(72) Inventor: Yung-Hung Chu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/778,879

(22) Filed: Feb. 27, 2013

(65) Prior Publication Data

US 2013/0259438 A1 Oct. 3, 2013

(30) Foreign Application Priority Data

Mar. 27, 2012 (TW) .............. 101205518 A

(51) Int. Cl.
G02B 6/44 (2006.01)
(52) U.S. Cl.
CPC ............ G02B 6/4457 (2013.01); G02B 6/4439 (2013.01)
USPC .......................................... 385/135
(58) Field of Classification Search
CPC ................................... G02B 6/4439
USPC .......................................... 385/135
See application file for complete search history.

(56) References Cited

U.S. PATENT DOCUMENTS

2012/0055209 A1* 3/2012 Conti et al. ...................... 70/15
2013/0200193 A1* 8/2013 Lichoulas et al. ......... 242/118.3

* cited by examiner

Primary Examiner — Eric Wong
(74) Attorney, Agent, or Firm — Novak Druce Connolly Bove + Quigg LLP

(57) ABSTRACT

A cable management device includes a base and a locking member. The base includes a first body and a plurality of first arms. The first body defines a shaft hole, and each first arm includes a stop. The locking member includes a second body, a shaft, and a plurality of second arms. Each second arm includes a locking portion. The shaft of the locking member is received in the shaft hole of the base and capable of rotating relative to the base. A cable wraps the plurality of locking portions of the plurality of second arms. Rotation of the locking member allows the plurality of first arms of the base to overlap with the plurality of second arms of the base, respectively. The stops of base and the locking portions of the locking member collectively form a plurality of latching hole to fix the cable.

6 Claims, 5 Drawing Sheets

CABLE MANAGEMENT DEVICE FOR COMMUNICATION PRODUCT

BACKGROUND

1. Technical Field

The present disclosure generally relates to cable management devices, more particularly to a cable management device for a communication product.

2. Description of Related Art

A communication product, such as a gateway, includes long optical fiber cables to transmit signals. In order to prevent the long optical fiber cables from tangling, a cable management device is used for arranging the optical fiber cables. Generally, the cable management device includes a base and a plurality of locking members separated from each other and mounted on the base independently. The long optical fiber cables wrap on the plurality of locking members. Rotation of the locking members allows to the long optical fiber cables to be locked in the locking members.

Because the plurality of locking members should be mounted on the base and rotated to lock the cables respectively, and due to separation of the plurality of locking members, it takes more time to arrange the cables along with increase of number of the locking members, which leads to low working efficiency.

Therefore, a need exists in the industry to overcome the described problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
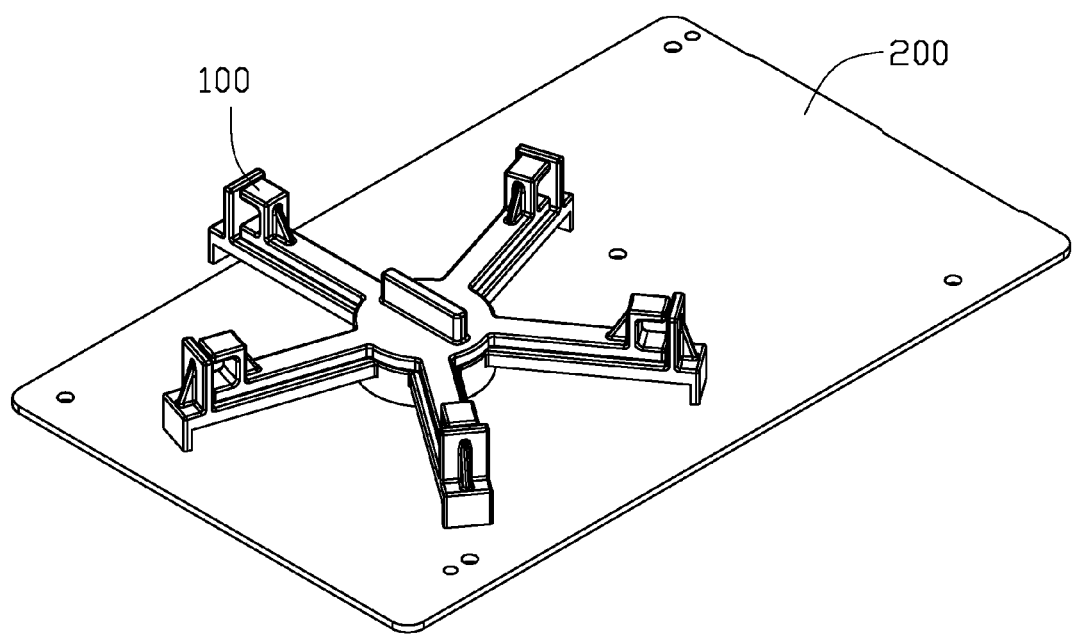
FIG. 1 is a perspective view of a cable management device of an exemplary embodiment of the disclosure, wherein the cable management device is mounted on a positioning board of a communication product.

With reference to FIG. 1, the cable management device 100 is fixed on a positioning board 200 of a communication product (not shown). The cable management device 100 is in communication with an exterior communication device via a cable 300 (referring to FIG. 4). The cable management device 100 is used to pack up the cable 300, and house the cable 300 in the communication product for reserve. In the embodiment, the cable 300 is an optical fiber cable.

Figure 2:
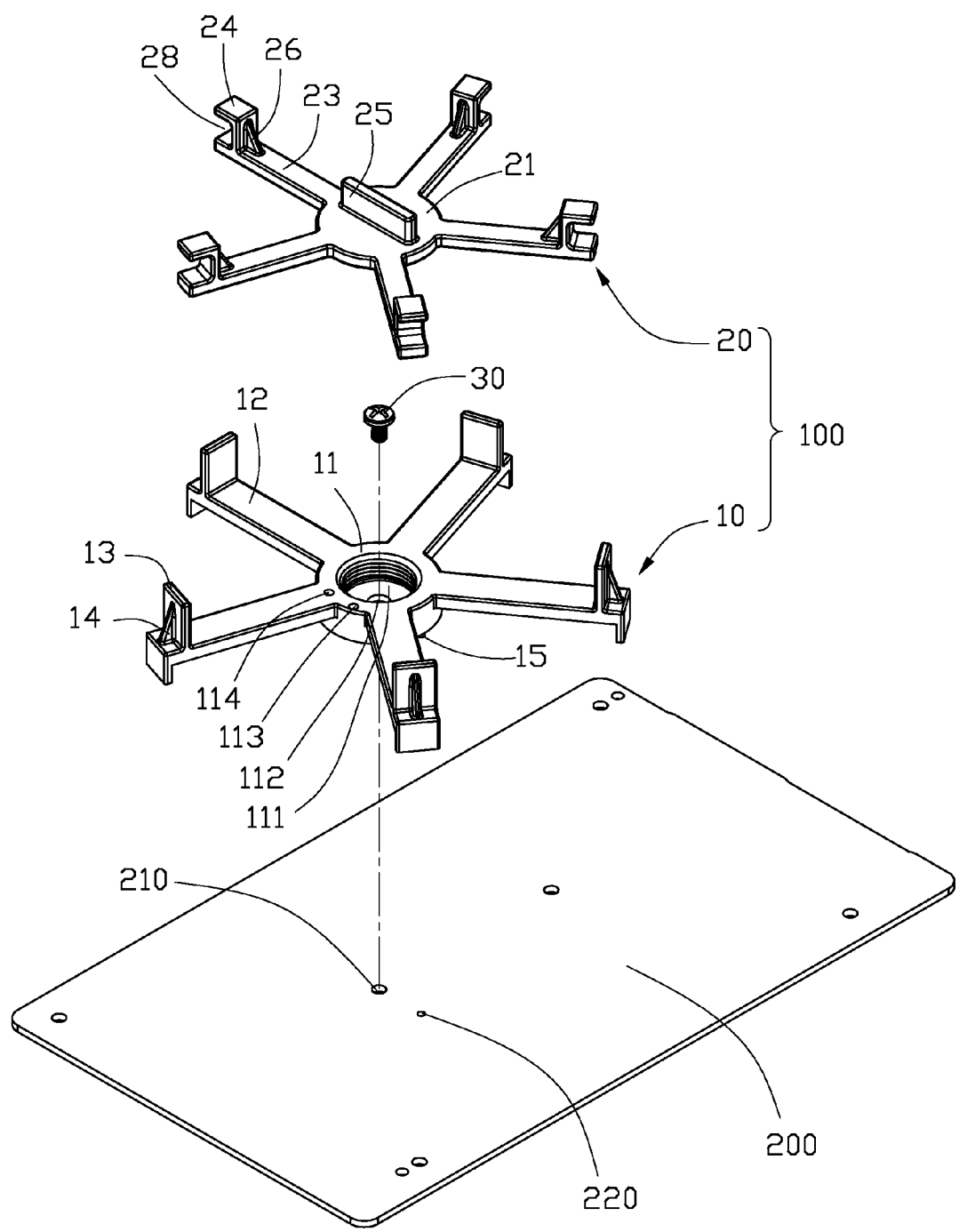
FIG. 2 is an exploded view of the cable management device of FIG. 1.
Figure 3:
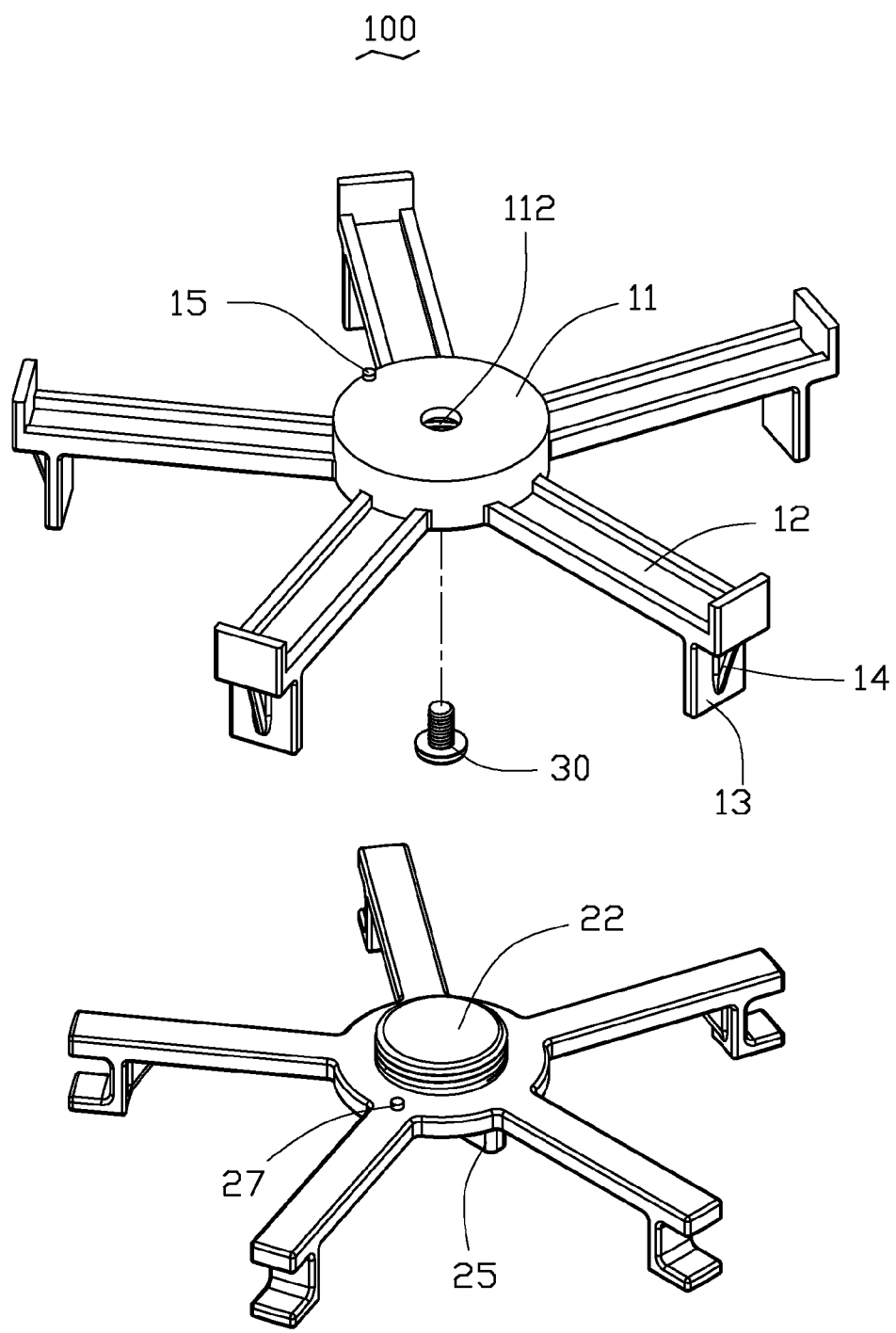
FIG. 3 is an exploded view of the cable management device of FIG. 1 in another view.

With reference to FIG. 2 and FIG. 3, the cable management device 100 includes a base 10 and a locking member 20. The base 10 is fixed on the positioning board 200, and includes a first body 11 and a plurality of arms 12 extending from the first body 11. In the embodiment, the first body 11 is in a shape of a column, and the plurality of arms radially extend from the first body 11 and are spaced evenly from each other. The plurality of first arms 12 are parallel to the positioning board 200.

The first body 11 defines a shaft hole 111, and each of the plurality of first arms 12 includes a stop 13 located on a free end of the first arm 12. In the embodiment, a bottom of the shaft hole 111 defines a first positioning hole 112 (referring to FIG. 3), and a bottom of the first body 11 includes a positioning pin 15. The positioning board 200 defines a second positioning hole 210 and a third positioning hole 220. In assembly, the positioning pin 15 of the first body 11 is received in the third positioning hole 220 of the positioning board 200, the first positioning hole 112 of the first body 11 overlaps on the second positioning hole 210 of the positioning board 200. A screw 30 runs through the first positioning hole 112 and the second positioning hole 210, and as a result, the base 10 is fixed on the positioning board 200.

The locking member 20 includes a second body 21, a shaft 22 and a plurality of second arms 23 corresponding to the plurality of first arms 12 of the base 10. In assembly, the shaft 22 is received in the shaft hole 111 of the base 10 and capable of rotating in the shaft hole 111. In the embodiment, the second body 21 is in a shape of a disk, the shaft 22 extends from a first side of the second body 21, and the plurality of second arms 23 radially extend from the disk and are evenly spaced apart from each other. The plurality of second arms 23 are parallel with the positioning board 200.

In the embodiment, number of the first arms 12 and the second arms 23 are both five. Alternatively, the number of the first arms 12 and second arms 23 can be changed according to different requirements.

Each of the plurality of second arms 23 includes a locking portion 24 formed in a distal end of the second arm 23. The locking portion 24 defines an open 28 opposite to the second body 21 of the locking member 20.

In the embodiment, the first body 11 of the base 10 defines a first recess 113 and a second recess 114, and the second body 21 of the locking member 20 includes a projection 27. When the projection 27 engages with the first recess 113, the cable management device 100 is in an open state with the locking portions 24 of the locking member 20 opening. When the projection 27 engages with the second recess 114, the cable management device 100 is in a close state with the locking portions 24 of the locking member 20 closed.

Figure 4:
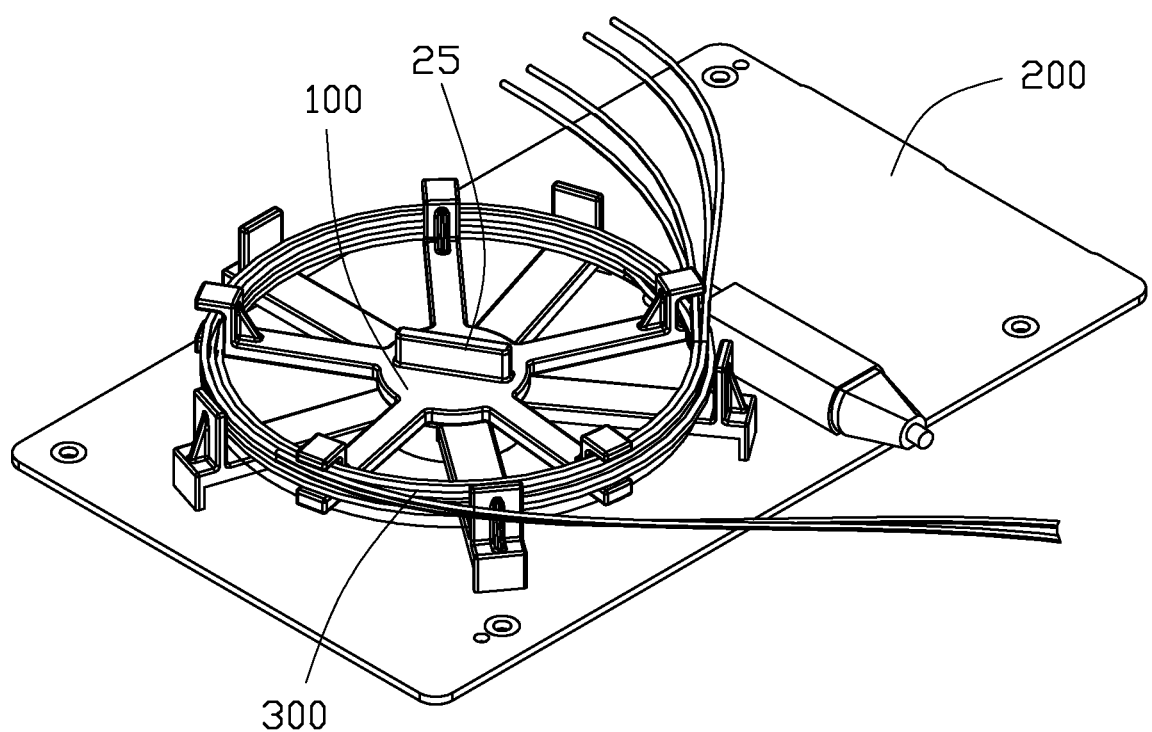
FIG. 4 is a schematic view of a cable wrapped in the cable management device of FIG. 1 when the cable management device is in an open state.
Figure 5:
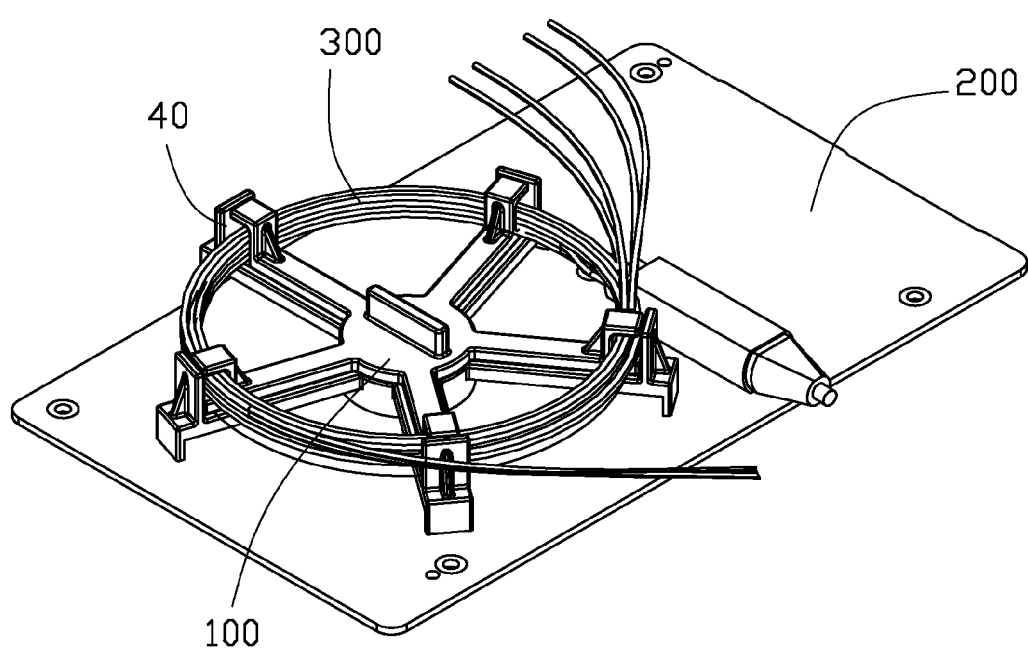
FIG. 5 is a schematic view of the cable management device of FIG. 4 in a close state.

With reference to FIG. 4 and FIG. 5, in assembly, the shaft 22 of the locking member 20 is received in the shaft hole 111 of the base 10. The projection 27 of the locking member 20 engages with the first recess 113 of the first body 11 of the base 10. The cable management device 100 is in an open state with the second arms 23 of the locking member 20 and the first arms 12 of the base 10 staggered with each other. The cable 300 is wrapped in the locking portions 24 of the locking member 20 to form a plurality of loops with the cable 300 latched into the opens 28 of the locking portions 24. Rotation of the locking member 20 allows the projection 27 of the locking member 20 to escape from the first recess 113 of the base 10 and engage with the second recess 114 of the base 10. As a result, the second arms 23 of the locking member 20 overlap the first arms 12 of the base 10, respectively. The stops 13 of the base 10 close the opens 28 of the locking portion 24 of the locking member 20, respectively to fix the cable 300 in the locking portions. That is, the stops 13 of the base 10 and the locking portion 24 of the locking member 20 collectively forms a plurality of latching holes 40 to lock the cable 300 into the latching holes 40, referring to FIG. 5.

In the embodiment, the shaft hole 111 of the base 10 is a screw hole, an outer surface of the shaft 22 of the locking member 20 includes a plurality of screw threads to matched with the screw hole, which ensures rotation of the locking member 20 relative to the base 10 and the locking member 20 secured in the base 10.

In the embodiment, the base 10 includes a plurality of first ribs 14 corresponding to the plurality of the stops 13 of the base 10. Each of the plurality of first ribs 14 is connected between a corresponding stop 13 of the base 10 and a top of a corresponding first arm 12 of the base 10. The locking member 20 includes a plurality of second ribs 26 corresponding to the plurality of locking portions 24 of the locking member 20. Each of the plurality of second ribs 26 is connected between a corresponding locking portion 24 and a top of a corresponding second arm 23 of the locking member 20. The first ribs 14 and the second ribs 26 are positioned to enhance intensity of the cable management device 100, which can prevent the locking portions 24 of the locking member 20 damaged during a process of management of the cable 300.

In the embodiment, the locking member 20 includes a handle 25 extending from a second side of the second body 21 opposite to the first side of the second body 21. It is convenient to rotate the locking member 20 by way of the handle 25.

The cable management device 100 of the disclosure arranges the cable 300 by rotation of the locking member 20 relative to the base 10 one time, which improves efficiency of arranging cables. In addition, the cable management device 100 has a simple structure, which results in low cost.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A cable management device, comprising:

a base comprising a first body and a plurality of first arms radially extending from a periphery of the first body and spaced evenly from each other, the first body defining a shaft hole, and a stop fixed to a free end of each of the plurality of first arms, the first body defining a first recess and a second recess; and a locking member comprising a second body, a shaft extending from one side of the second body, and a plurality of second arms radially extending from a periphery of the second body and evenly spaced apart from each other, each of the plurality of second arms comprising a locking portion defining an open opposite to the stop of the first arm, the second body comprising a projection, wherein the plurality of second arms corresponds to the plurality of the first arms, respectively;

wherein the locking member rotatably connects with the base by an engagement of the shaft and the shaft hole; the locking member is configured to rotate on the base between a first position and a second position; at the first position, the second arms of the locking member stagger with the first arms of the base to expose the opens with the projection inserted in the first recess, a cable wraps the plurality of locking portions of the plurality of second arms from the opens; in the second position, the first arms overlap with the second arms with the stops of the first arms blocking up the opens of the second arms to form a plurality of latching hole, so that the cable is fixed in the latching holes, and the projection is inserted in the second recess.

2. The cable management device of claim 1, wherein the first body is in a shape of a column.

3. The cable management device of claim 1, wherein the second body of the cable locking member is in a shape of a disk.

4. The cable management device of claim 1, wherein each of the plurality of first arms of the base comprises a first rib connected between a corresponding stop and a top of a corresponding first arm.

5. The cable management device of claim 1, wherein each of the plurality of second arms of the locking member comprises a second rib connected between a corresponding locking portion and a top of the corresponding second arm.

6. The cable management device of claim 1, further comprising a handle, wherein the handle and the shaft extend from the two opposite sides of the second body of the locking member, respectively, wherein the handle is a protrusion.

* * * * *